United States Patent [19]
Röder

[11] Patent Number: 5,997,184
[45] Date of Patent: Dec. 7, 1999

[54] BEARING ASSEMBLIES FOR SHIFTABLY SUPPORTING AN UPPER ROLL OF A SLIVER DRAWING FRAME

[75] Inventor: Mario Röder, Mönchengladbach, Germany

[73] Assignee: Trützschler GmbH & Co. KG, Mönchengladbach, Germany

[21] Appl. No.: 09/020,822

[22] Filed: Feb. 9, 1998

[30] Foreign Application Priority Data

Feb. 8, 1997 [DE] Germany ............................ 197 04 816

[51] Int. Cl.$^6$ ...................................................... F16C 19/26
[52] U.S. Cl. ............................................................ 384/581
[58] Field of Search .................................... 384/581, 582, 384/535, 536, 419

[56] References Cited

U.S. PATENT DOCUMENTS

| 4,122,772 | 10/1978 | Dahlgren . | |
|---|---|---|---|
| 4,848,686 | 7/1989 | Demuth et al. | 384/536 |
| 5,333,516 | 8/1994 | Edwards et al. | 384/419 |

FOREIGN PATENT DOCUMENTS 680584  9/1992  Switzerland .

Primary Examiner—Lenard A. Footland
Attorney, Agent, or Firm—Venable; Gabor J. Kelemen

[57] ABSTRACT

Bearing assemblies for supporting opposite stub shafts of an upper drawing roll of a textile sliver drawing frame. Each bearing assembly includes a bearing sleeve having an inner cylindrical surface and an open end through which a respective stub shaft projects into the bearing sleeve; rolling bodies disposed circumferentially between the stub shaft and the inner cylindrical surface of the bearing sleeve; a spring supporting member disposed in the bearing sleeve and being affixed to the inner cylindrical surface thereof; and a holding element disposed in the bearing sleeve between the spring supporting member and the end face of the stub shaft. The holding element is axially displaceable relative to the bearing sleeve. A spring is disposed in the bearing sleeve between and in contact with, the spring supporting member and the end face of the stub shaft. The drawing roll is axially shiftable relative to the bearing sleeves of the first and second bearing assemblies against the force of the spring towards which the roll is shifted.

13 Claims, 5 Drawing Sheets

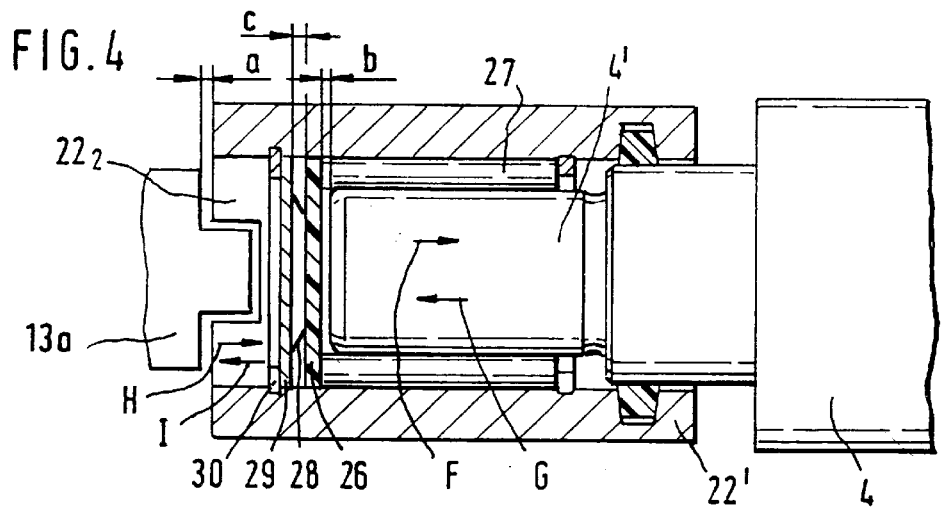
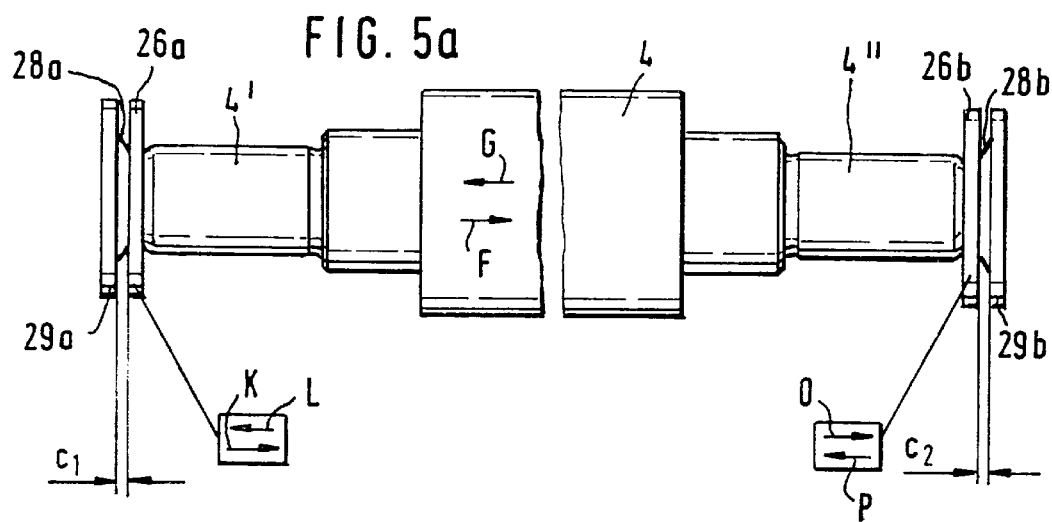
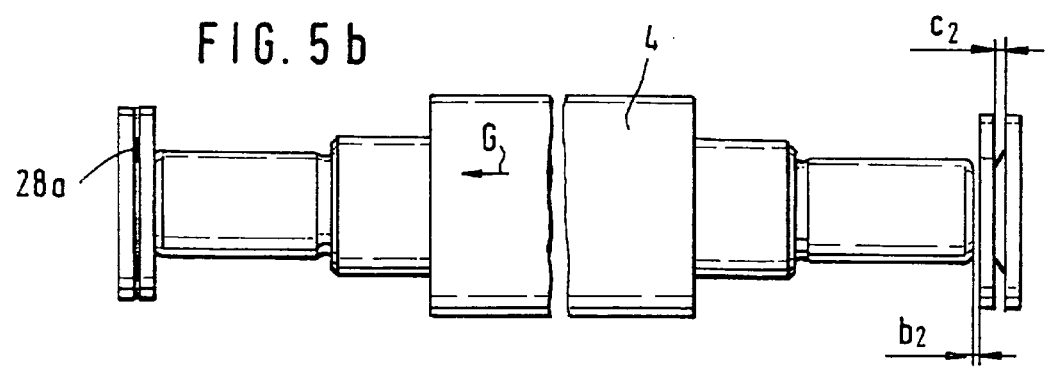

BEARING ASSEMBLIES FOR SHIFTABLY SUPPORTING AN UPPER ROLL OF A SLIVER DRAWING FRAME

CROSS REFERENCE TO RELATED APPLICATION

This application claims the priority of German Application No. 197 04 816.1 filed Feb. 8, 1997, which is incorporated herein by reference.

BACKGROUND OF THE INVENTION

This invention relates to bearing assemblies for axially shiftably supporting an upper roll of a drawing unit of a sliver drawing frame. The two opposite stub shafts of the upper roll are supported in bearing sleeves of the assemblies and between the inner surface of each bearing sleeve and the stub shaft rolling bodies such as bearing needles are provided. In the bearing sleeve a holding element, for example, a disk is arranged which adjoins the end face of the stub shaft. In such an arrangement the roll is axially displaceable.

The upper rolls (pressing rolls) in a drawing unit of a drawing frame are pressed, with their elastic coating provided on their outer surface, against respective driven lower rolls. A sliver bundle composed of a plurality of slivers is passed between cooperating upper and lower rolls. This arrangement is used for advancing and drawing the sliver bundle. In a known device cylindrically hollow bearing sleeves are provided for the upper roll; the bearing sleeves are open at one end face and are provided with a fork-like fitting at the other end face. Before positioning the upper roll in the drawing unit, the two opposite stub shafts of the upper roll are pushed into the open end face of the respective bearing sleeve. Thereafter the upper roll is placed in position in such a manner that the fork-like fittings are brought into engagement with the projection of a respective stationary countersupport mounted on a stand which, in turn, is attached to the machine frame. Determined by a random axial position, clearances are present at each end of the roll between the fork-like fitting and the stationary countersupport as well as between the end faces of the stub shafts and the respective holding elements (such as disks). In this manner, at standstill both bearing sleeves as well as the upper roll are displaceable in the axial direction. During operation the bearing sleeves are loaded by pressing devices, such as springs or pneumatic cylinders and are in this manner fixed in a predetermined position so that an axial displacement of the bearing sleeves is no longer possible. In contrast, the upper roll must be sufficiently axially displaceable during operation. During such a displacement, the axial forces cause friction between the stub shafts and the rolling bodies (such as bearing needles). The friction, whose extent depends from the magnitude of the pressing force, generates heat. Dependent on the position in which the bearing sleeves were locally fixed in random positions thereof, the distances between the end faces of the stub shafts and the respective holding elements (support disks) are different. The positions are random because of the above-noted clearances. An extreme case is possible where both end faces of the rotating stub shafts are constantly in frictional contact with the stationary holding disks. Because of the friction between the stub shafts and the rolling bodies due to axial forces, in the bearing sleeves heat is generated which increases with increasing roll-pressing forces. As a result, an undesired heating of the bearing sleeves occurs, for example, beyond 130° C., and no access for air is provided. Consequently, heat cannot be removed by air circulation. In case on both sides a very small clearance is provided, each end face is periodically only slightly moved away from the holding disk and the clearance is too narrow to make possible a sufficient air intake for providing heat removal. The bearing temperatures are disadvantageously exceeded in structures where such a small axial play is present. As a result, the holding disks, particularly if made of a synthetic material, may be destroyed and thus the holding function for the upper roll fails. Also, the sealing at the end face of the bearing sleeves is absent which may lead to operational disturbances.

SUMMARY OF THE INVENTION

It is an object of the invention to provide an improved device of the above-outlined type from which the discussed disadvantages are eliminated and which, in particular, makes possible in a simple manner a disturbance-free operation of the drawing unit.

This object and others to become apparent as the specification progresses, are accomplished by the invention, according to which, briefly stated, each bearing assembly for supporting opposite stub shafts of an upper drawing roll of a textile sliver drawing assembly includes a bearing sleeve having an inner surface and an open end through which a respective stub shaft projects into the bearing sleeve; rolling bodies disposed circumferentially between the stub shaft and the inner surface of the bearing sleeve; a spring supporting member disposed in the bearing sleeve and being affixed to the inner surface thereof; and a holding element disposed in the bearing sleeve between the spring supporting member and the end face of the stub shaft. The holding element is axially displaceable relative to the bearing sleeve. A spring is disposed in the bearing sleeve between and in contact with, the spring supporting member and the end face of the stub shaft. The drawing roll is axially shiftable relative to the bearing sleeves of the first and second bearing assemblies against the force of the spring towards which the roll is shifted.

By providing that the holding elements (such as disks) are spring-biased and are shiftable, at standstill in each bearing sleeve a predetermined distance between the holding element and the spring supporting member is ensured. If the bearing sleeve is inserted on one stub shaft of the roll, the end face of the stub shaft may touch the adjoining holding element; the relaxed spring, however, holds the spring supporting member and thus the bearing sleeve at a certain distance. In this position, that is, by keeping apart the two bearing sleeves at a predetermined distance, the upper roll is inserted into the drawing unit and the two bearing sleeves are placed under a pressing load and are locally immobilized. If during operation the upper roll is shifted axially in the one or the other direction, the end face of the roll stub shaft shifts the respective holding element against its spring which is thus compressed. Thus, at that side, the end face of the stub shaft engages the holding element, and the distance between the holding element and the spring supporting member is reduced. At the same time, on the other, opposite side, the end face of the other stub shaft moves sufficiently away from the associated holding element, and a clearance is obtained, permitting air to gain access for heat removal. As soon as the upper roll is again shifted in the other direction, on that side a sufficient clearance between the end face of the stub shaft and the holding element is obtained, whereby heat is effectively removed at that location. Thus, even heat developing from high pressing forces—to obtain higher clamping pressures and thus an improved production—is compensated for. By virtue of the measures according to the invention, an impermissible heating of the bearing sleeves is avoided in an unexpected manner, and thus a disturbance-free operation of the drawing unit is ensured.

The invention has the following additional advantageous features:

The holding element is a plastic disk and the plastic material is self-lubricating.

The holding element hermetically closes off the rolling bodies (such as bearing needles).

The holding element is in engagement with one end face of the rolling bodies.

The rolling bodies are axially shiftable.

The rolling bodies cooperate with an abutment at the other stub shaft end.

The stationary spring supporting member is a disk made, for example, of sheet metal and is immobilized at the inner cylindrical surface of the bearing sleeve by a securing ring.

The upper roll may be manually inserted.

The upper roll may be pivoted into and out of the operating position together with the pressing device, for example, a pressing arm.

BRIEF DESCRIPTION OF THE DRAWINGS

FIG. 4 is a side elevational view of a bearing sleeve for an upper roll, according to a preferred embodiment of the invention.

FIG. 5a is a schematic side elevational view of the device according to the invention, depicted at standstill.

FIG. 5b is a schematic side elevational view of the device according to the invention, depicted during operation.

DESCRIPTION OF THE PREFERRED EMBODIMENTS

Figure 1:
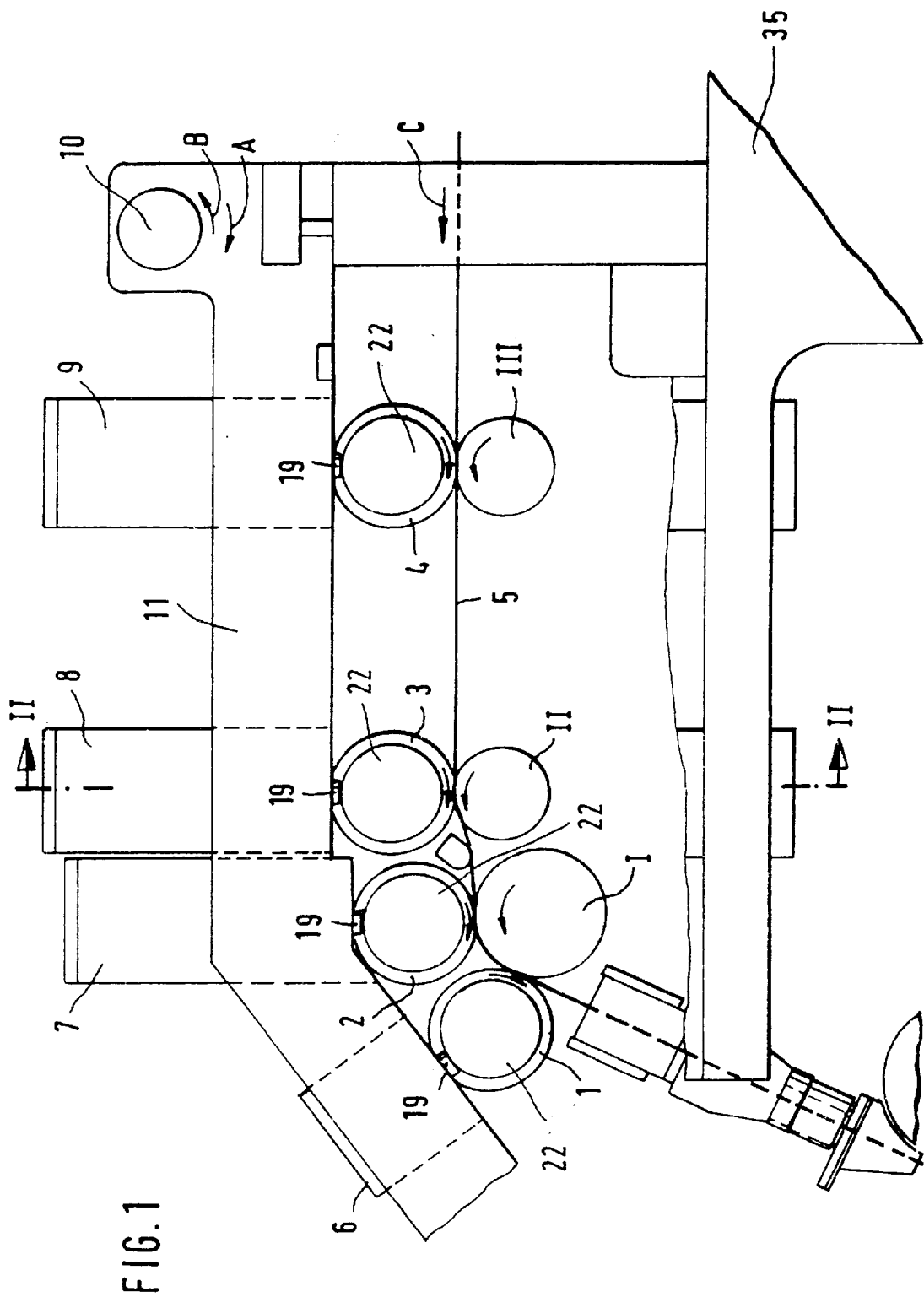
FIG. 1 is a side elevational view of a drawing unit incorporating the invention.

FIG. 1 shows a drawing unit forming part, for example, of an HS-model drawing frame manufactured by Trützschler GmbH & Co. KG, Mönchengladbach, Germany. The drawing unit is of the "4-over-3" type, that is, it is formed of three lower rolls I (lower output roll), II (lower middle roll) and III (lower input roll) and four upper rolls 1, 2, 3 and 4. The drawing unit drafts the sliver bundle 5 formed of a plurality of slivers and advancing through the drawing unit in the direction of the arrow C. The roll pairs formed of rolls 4 and III as well as 3 and II constitute a pre-drafting field while the roll pair formed of rolls 3 and II and the roll assembly formed of rolls 1, 2 and I constitute the principal drawing field.

The lower output roll I is driven by a non-illustrated principal motor which determines the output speed. The lower input roll III and the lower middle roll II are driven by a non-illustrated regulating motor. The upper rolls 1–4 are pressed against the respective lower rolls I, II, III by pressing devices 6, 7, 8 and 9 positioned in pressing arms 11 (only one is visible) rotatable in the direction of arrows A and B about a bearing 10. The upper rolls 1–4 are driven by the respective lower rolls I, II and III by frictional contact.

Figure 2:
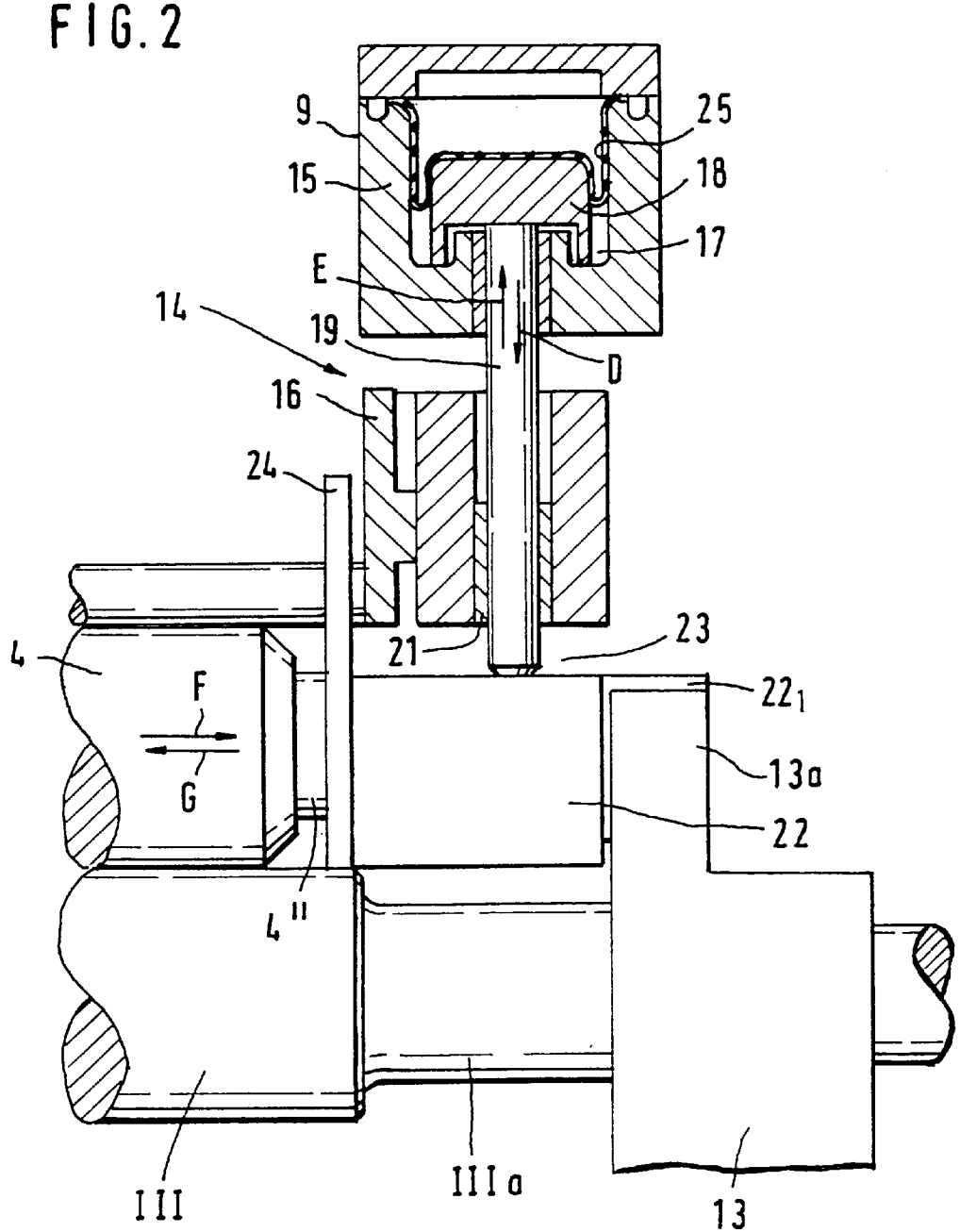
FIG. 2 is a sectional view taken along line II—II of FIG. 1.

Also referring to FIG. 2, the lower rolls I, II and III are supported in a stand 13 mounted on the machine frame 35. The pressing arms 11 also serve for shiftably receiving two upper roll holders 14 for accommodating the upper rolls 1–4. Each upper roll holder 14 is composed of an upper part 15 and a lower part 16. The upper part 15 forms a cylinder unit having a cylinder chamber 17 in which a piston 18 is slidably received. A piston rod (pressure rod) 19 is attached to the piston 18 and is guided in a bore 21 of the lower part 16. The stub shaft 4" of the upper roll 4 projects through an opening of a holding plate 24 and is received in a bearing assembly 22 which extends in a space 23 between the pressing roll holder 14 and the roll stub shaft IIIa of the lower roll III.

A diaphragm 25 which is in engagement with the face of the piston 18 divides the cylinder chamber 17 into an upper work chamber and a lower work chamber which may be selectively vented or charged with compressed air.

In operation, after a sliver bundle 5 has been positioned over the lower rolls I, II and III, the pressing arms 11 are pivoted inwardly (downwardly) into the working position illustrated in FIG. 1 and immobilized therein so that the upper rolls 1, 2, 3 and 4 may press the sliver bundle 5 against the lower rolls I, II and III. Such a pressing force is effected by the pressurization of the upper work chamber 17 of each pressing device 9, as a result of which the respective pressure rod 19—displaceable in the direction of the arrows D and E—presses down on the associated bearing assemblies 22 holding the upper rolls 1–4 which, in turn, press down on the respective lower rolls I, II, III.

The bearing 22 assembly has at one end a projection $22_1$ which is received in a support fork 13a stationarily affixed to the stand 13 which, in turn, is mounted on the machine frame 35.

Figure 3:
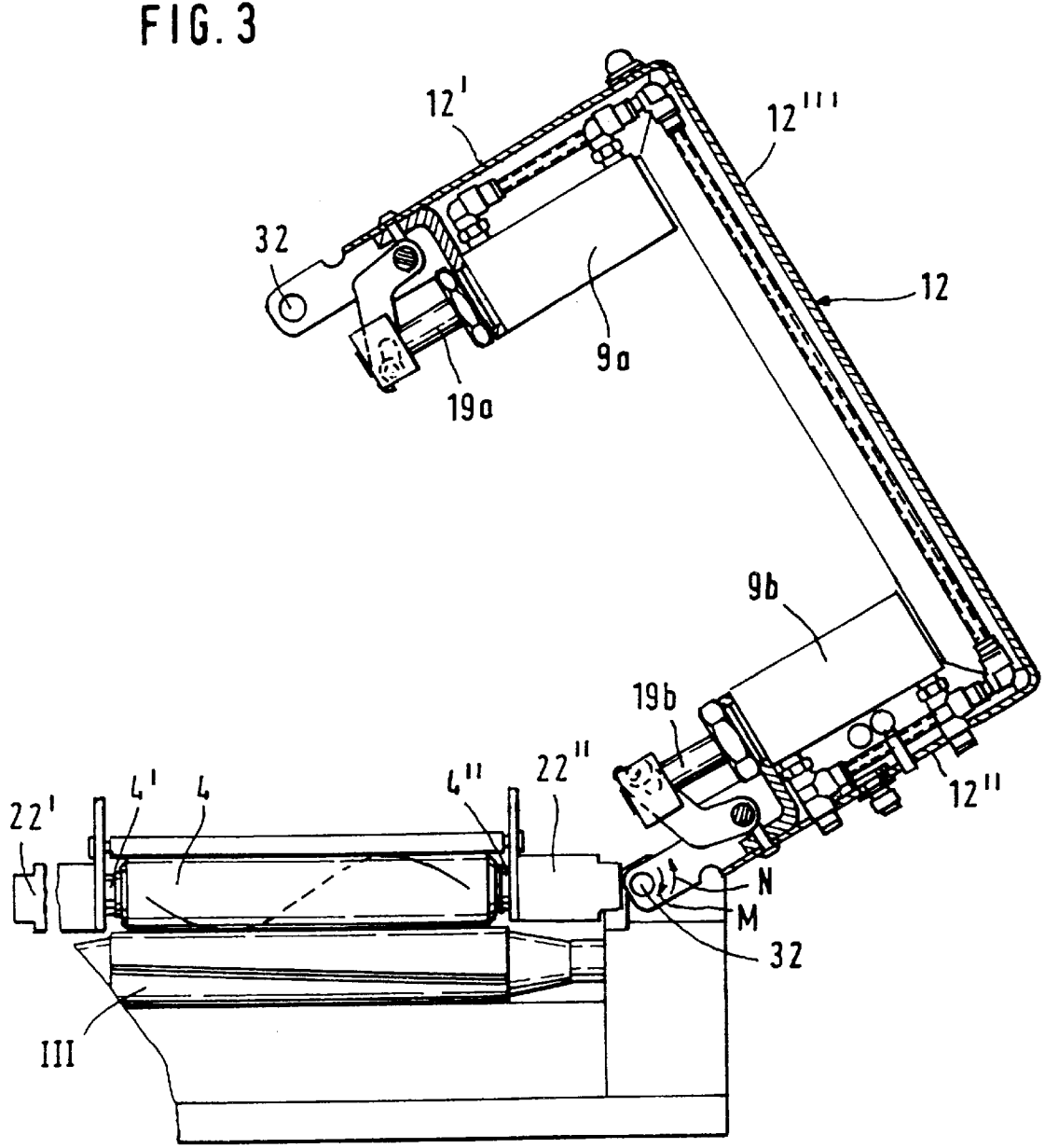
FIG. 3 is a front elevational view of a drawing unit showing a portal-shaped pressing arm in an outwardly pivoted, open position.

Turning to FIG. 3, with the upper roll 4 a portal-shaped pressing arm 12 is associated which extends parallel to the longitudinal axis of the upper roll 4. The pressing arm 12 is formed of two lateral columns 12' and 12" and a traverse 12'''. On the lateral columns 12', 12" pneumatic cylinders 9a and 9b are mounted, having respective pressing rods 19a and 19b. The pressing arm 12 is pivotal about a stationary rotary bearing 32 in the direction of the arrows M, N. FIG. 3 illustrates the pressing arm 12 in its outwardly pivoted position. At the lower end of the lateral column 12' an opening 32 is provided through which a non-illustrated locking bar projects which is mounted on the machine frame 35. The other upper rolls 1, 2 and 3 are associated with similar, portal-shaped pressing arms 12.

Turning to FIG. 4, the bearing assembly has a cylindrical bearing sleeve 22' which is open at one end and which has a fork-like fitting $22_2$ at its other end. The stub shaft 4' of the upper roll 4 is pushed into the bearing sleeve 22' through its open end. The forked fitting $22_2$ is in engagement with a projection of the adjoining stationary support 13a of the stand 13 mounted on the machine frame 35. A clearance a is provided between the forked fitting $22_2$ and the support 13a, and a clearance b is provided between the end face of the stub shaft 4' and a holding element (holding disk) 26 made, for example, of a self-lubricating plastic material. At standstill, that is, when no load is exerted on the upper roll 4, the bearing sleeve 22' is shiftable in the direction of the arrows H, I whereas the stub shaft 4' of the upper roll 4 is shiftable in the direction of the arrows F, G. In operation, that is, when a load is applied on the bearing sleeve 22', only the stub shaft 4' is shiftable. Between the inner cylindrical surface of the bearing sleeve 22' and the stub shaft 4' rolling bodies, for example, bearing needles 27 are provided. The holding disk 26 is, on its side oriented towards the end face of the stub shaft 4', adjoined by a biased spring 28. The holding disk 26 is shiftable in an axial direction as shown by the arrows K, L relative to the stub shaft 4' of the upper roll 4. The spring 28 is countersupported by a stationary spring supporting member (such as a stationary metal disk) 29 which is immobilized by a securing ring 30 received in a circumferential groove provided in the inner cylindrical surface of the bearing sleeve 22'.

FIG. 5a schematically shows the position of the holding disks 26a, 27b after the bearing sleeves 22' and 22" have been inserted on the stub shafts 4' and 4", respectively. On each side of the upper roll 4, the springs 28a and 28b are relaxed and contact the respective holding disks 26a and 26b, positioning them against the respective end faces of the roll stub shafts 4' and 4". Between the end faces and the respective holding disks 26a, 26b on each side the clearance b (FIG. 4) has been reduced to zero: the end faces are in engagement with the holding disks 26a, 26b. In contrast, between the holding disks 26a and 27b and the respective spring supporting metal disks 29a and 29b on each side a clearance $c_1$ and $c_2$, respectively, is maintained. It is in this condition that the upper roll 4 is, together with the bearing sleeves 22' and 22" placed into the drawing unit. Also referring to FIG. 3, the bearing sleeves 22' and 22" are thereafter loaded by the pressing rods 19a and 19b of the pressing elements 9a and 9b and thus are locally immobilized in their position against shifting. In operation, as the sliver bundle 5 passes between the upper and lower rolls, an axial shifting motion of the upper rolls 1–4 takes place in the direction of arrows F and G. If, for example, the upper roll 4 is shifted in the direction G into a position as shown in FIG. 5b, the spring 28a is compressed flat and thus tensioned and the clearance $c_1$ between the holding disk 26a and the metal disk 29a is reduced to a minimum. The end face of the stub shaft 4' lies against the holding disk 26a without any clearance. By shifting the upper roll 4 in the direction G, the end face of the stub shaft 4" moves away from the holding disk 26b so that a clearance $b_2$ is obtained. The spring 28b remains in a relaxed state so that the clearance $b_2$ remains unchanged and thus the holding disk 26b remains stationary. Thus, as a result, as long as the clearance $b_2$ between the end face of the stub shaft 4" and the holding disk 26b is maintained, air may gain access therethrough and heat may be removed.

Figure 6A:
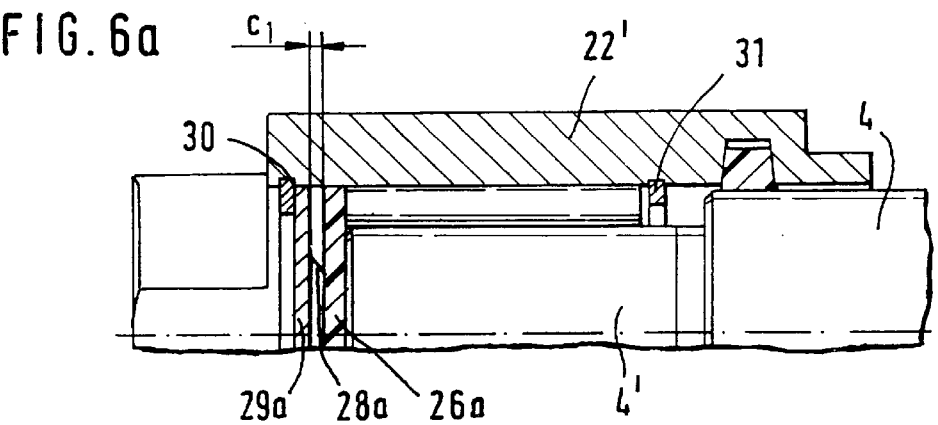
FIGS. 6a is a sectional side elevational view of one of the bearing assemblies of the preferred embodiment in a first axial position of the drawing roll.
Figure 6B:
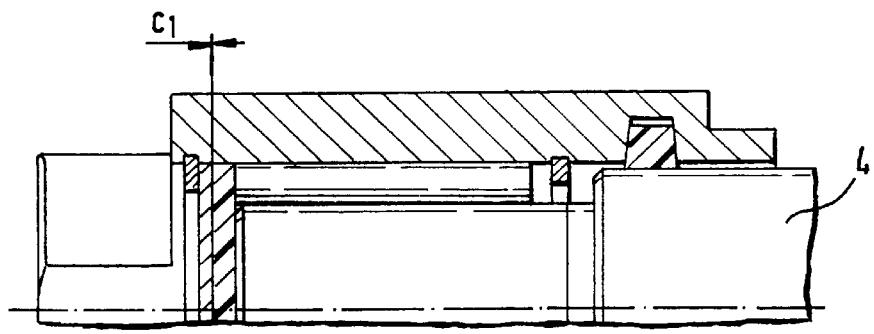
FIGS. 6b and 6c are sectional side elevational views of the two bearing assemblies of the preferred embodiment in a second axial position of the drawing roll.
Figure 6C:
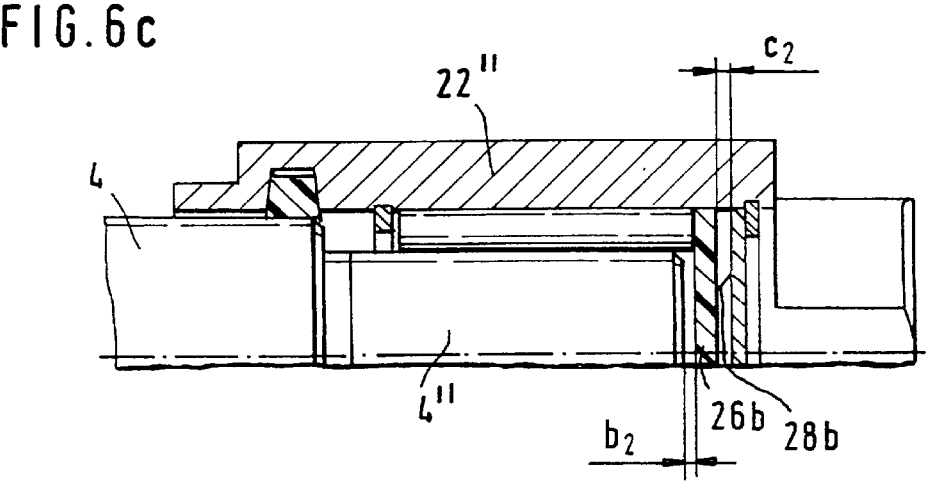

The above-described arrangement ensures that the upper roll has a sufficient axial play in any operational condition that may be encountered; it is of no consequence whether the upper roll 4 is placed in position manually, or is pivoted out of the working position together with the pressing arm (such as the pressing arm 12 of FIG. 3) or is driven without a cleaning bar. At all times when the upper roll 9 is not pressed down by the pressing device (such as the pneumatic cylinders 9a and 9b of FIG. 3), the springs 28a, 28b are in a relaxed state as depicted in FIG. 5a and 6a. When, prior to starting the actual sliver drawing operation, the bearing sleeves 22' and 22" are loaded by the pressing devices, they, together with the spring-supporting metal disks 29a and 29b are immobilized. If, during operation, the upper roll 4 is shifted in the direction of the arrow G, the condition shown in FIGS. 5b, 6b and 6c is obtained, that is, an air-admitting clearance $b_2$ appears at the end of the stub shaft 4" due to the reduction of the clearance $c_1$ at the end of the stub shaft 4'.

While the invention was described in connection with the upper roll 4, it is to be understood that it finds application in all the other upper rolls 1, 2, and 3 (FIG. 1) of the drawing unit.

It will be understood that the above description of the present invention is susceptible to various modifications, changes and adaptations, and the same are intended to be comprehended within the meaning and range of equivalents of the appended claims.

What is claimed is:

1. The combination of a drawing roll of a textile sliver drawing frame with first and second bearing assemblies for supporting the roll;

said roll having oppositely oriented stub shafts, each having an end face;

each bearing assembly comprising
  (a) a bearing sleeve having an inner surface and an open end through which a respective said stub shaft projects into the bearing sleeve;
  (b) rolling bodies disposed circumferentially between said respective stub shaft and said inner surface of said bearing sleeve;
  (c) a spring supporting member disposed in said bearing sleeve and being affixed to said inner surface thereof;
  (d) a holding element disposed in said bearing sleeve between said spring supporting member and said end face of said respective stub shaft; said holding element being axially displaceable relative to said bearing sleeve; and
  (e) a spring disposed in said bearing sleeve between and being in contact with, said spring supporting member and said end face; said drawing roll being axially shiftable relative to the bearing sleeves of said first and second bearing assemblies against a force of a respective said spring towards which said roll is shifted.

2. The combination as defined in claim 1, wherein said holding element is a disk engageable and axially movable by said roll upon axial shifting of said roll toward said disk.

3. The combination as defined in claim 2, wherein said disk is plastic.

4. The combination as defined in claim 3, wherein said plastic is self-lubricating.

5. The combination as defined in claim 1, wherein said holding element hermetically seals said rolling bodies at one axially viewed side thereof.

6. The combination as defined in claim 1,wherein said spring is a disk spring.

7. The combination as defined in claim 1, wherein said spring i s a compression spring.

8. The combination as defined in claim 1, wherein said rolling bodies are bearing needles having opposite axial ends; said holding element being in engagement with one of said axial ends of said bearing needles.

9. The combination as defined in claim 1, wherein said rolling bodies are axially displaceable.

10. The combination as defined in claim 9, further comprising a stop disposed in said bearing sleeve for limiting an axial displacement of said rolling bodies away from said holding element.

11. The combination as defined in claim 1, wherein said spring supporting member is a disk.

12. The combination as defined in claim 11, wherein said disk is of metal.

13. The combination as defined in claim 1, further comprising securing means for fixedly attaching said spring supporting member to said bearing sleeve.

* * * * *